(12) United States Patent
Haas et al.

(10) Patent No.: US 7,086,239 B2
(45) Date of Patent: Aug. 8, 2006

(54) CONDENSER

(75) Inventors: Joachim Haas, Wangen (DE); Norbert Brutscher, Lindenberg (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 258 days.

(21) Appl. No.: 10/683,731

(22) Filed: Oct. 10, 2003

(65) Prior Publication Data

US 2005/0115249 A1 Jun. 2, 2005

(30) Foreign Application Priority Data

Oct. 10, 2002 (DE) ................................ 102 47 335

(51) Int. Cl.
*F25B 9/00* (2006.01)
(52) U.S. Cl. .................... 62/87; 62/93; 62/401; 62/80; 165/103; 165/54
(58) Field of Classification Search .................... 62/86, 62/87, 80, 93, 401, 402, 403; 165/103, 54, 165/99, 122
See application file for complete search history.

(56) References Cited

U.S. PATENT DOCUMENTS

| | | | |
|---|---|---|---|
| 4,352,273 A | 10/1982 | Kinsell et al. | |
| 5,214,935 A | 6/1993 | Brunskill | |
| 6,050,103 A * | 4/2000 | Ko ............................... | 62/401 |
| 6,595,010 B1 | 7/2003 | Sauterleute et al. | |
| 2002/0088245 A1 | 7/2002 | Sauterleute et al. | |
| 2002/0121103 A1 | 9/2002 | Udobot et al. | |

FOREIGN PATENT DOCUMENTS

| | | |
|---|---|---|
| DE | 19935918 | 2/2001 |
| DE | 10036443 | 4/2002 |
| EP | 1129941 | 9/2001 |
| WO | 91/12990 | 9/1991 |

\* cited by examiner

*Primary Examiner*—Chen Wen Jiang
(74) *Attorney, Agent, or Firm*—Dilworth & Barrese LLP

(57) ABSTRACT

The present invention relates to a condenser for an air-based climate control system, having an inlet and an outlet for the air to be cooled, an inlet and an outlet for the cool air, a heat exchange unit for heat transfer between the air to be cooled and the cool air, a bypass that circumvents the cool-air side of the heat exchange unit at least within a certain area, and a hot-air inlet on the cool-air side by means of which hot air can be fed into the condenser. A particularly low humidity even in partial power operation with continued high flow-through capacity of the climate control system is achieved according to the invention in that the hot-air inlet is positioned in such a way that the hot air essentially flows in a partial area of the inlet on the cool-air side of the condenser and that the bypass inlet is positioned in the partial area downstream from the hot-air inlet.

The present invention further relates to an air-based climate control system, especially for aircraft, having at least one turbine for decompression and cooling of the air to be fed into the passenger cabin and having a condenser with a heat exchange unit, the inlet on the cool-air side of which is connected with the turbine outlet, and having an admixture conduit by means of which hot air can be mixed into the air to be fed into the passenger cabin, with the admixture conduit feeding in downstream of the inlet on the cool-air side of the heat exchange unit.

17 Claims, 5 Drawing Sheets

CONDENSER

BACKGROUND OF THE INVENTION

The present invention relates to a condenser for an air-based climate control system, having an inlet and an outlet for the air to be cooled, an inlet and an outlet for the cool air, a heat exchange unit for heat transfer between the air to be cooled and the cool air, a bypass that circumvents the cool-air side of the heat exchange unit at least within a certain area, and a hot-air inlet on the cool-air side, by means of which hot air can be fed into the condenser.

Air-based climate control systems are used in particular in aircraft, with, among other things, minimal structural volume and weight as well as low humidity of the cool air being fundamental criteria in the design of these systems. In order to minimize structural volume and weight, the climate control system is designed to use as small a quantity of cool air as possible. For a given cooling performance, this usually results in the cool-air temperatures being below the freezing point. The air cooled in the climate control system is mixed with recirculated air from the space to be cooled, in order to achieve comfortable conditioned air diffusion temperatures of >10° C., as shown schematically in FIG. 1. After passing through a flap trap, the cool air emerging from climate control systems 1 and 2 is mixed in a mixing chamber with recirculated air drawn from the aircraft cabin and this air mixture is then fed into the cabin.

A problem arises due to the below-zero temperature of the cool air, which can lead to ice and snow formation around the outlet. This can result in the outlet conduit of the climate control system becoming at least partially obstructed and the delivery of cool air being jeopardized thereby. Therefore, a fundamental task of an air-based climate control system is to provide for an efficient dehumidification of the cool air: first, in order to reduce the potential for the aforementioned ice and snow formation in the outlet conduit, and second, in order to achieve a low cabin air humidity that corresponds to great passenger comfort.

Sufficient dehumidification is necessary not only when the climate control system is operating at maximum cooling power, but also in medium and low power ranges.

The structure of a typical aircraft climate control system according to the state of the art is shown in FIG. 2: with flow control valve (FCV) 10 in the open position, the hot-air side of preliminary heat exchanger (PHX) 20 is supplied with hot compressed air from the engine or an accessory aggregate (ca. 200° C. und 3 bar). The air is pre-cooled in preliminary heat exchanger 20 to about 100° C., for which ram air or ambient air is used that is fed through the ram air canal to preliminary heat exchanger 20. The air emerging from preliminary heat exchanger 20 is further compressed in a compressor 30. After that, a second cooling off of the compressed air follows in main heat exchanger (SHX) 40, which is positioned on the cold-air side of the ram air canal upstream from the preliminary heat exchanger. Here the air is cooled to about 40° C. and subsequently dehumidified in a water elimination system comprised of the following components: reheater 50, condenser 70, and water eliminator 80. Cold turbine outlet air flows through the low-pressure side of condenser 70, which causes the air on the hot, high-pressure side of condenser 70 to cool off and condense. The condensed water is eliminated in water eliminator 80, which is positioned downstream from condenser 70. The air dehumidified in this way, after passing reheater 50, is then decompressed in turbine 60 and thereby cooled down as far as about −30° C. The shaft output arising at the turbine is used to drive compressor 30 as well as blower 120 positioned in the ram air canal. From the turbine outlet, the air flows through the low-pressure side of condenser 70 and thereafter into a mixing chamber and/or into the cabin.

The temperature regulation or regulation of the cooling power of the system is done via a valve 90, 100, or 110, that allows for a variable bypass of different parts of the climate control system. When one of the aforementioned valves 90, 100, 110 is opened, hot air (40° C. to 200° C.) is mixed in at the turbine outlet, and the outlet temperature of the climate control system is regulated in this way. As can be seen in FIG. 2, the bypass air can be tapped at different positions as needed. Valve 90 is positioned in a bypass that emerges from the outlet on the compressed-air side of heat exchanger 20, valve 100 is positioned in a bypass conduit that emerges from the inlet on the compressed-air side of heat exchanger 20, and valve 110 is located in a bypass conduit that emerges from the turbine inlet.

All of the aforementioned bypass variants share in common that the admixture occurs after turbine 60 and/or at the inlet of the low-pressure side of condenser 70. The reason for this essentially lies in the fact that valves 90, 100, 110 are also used in order to melt away any ice build-up between the turbine outlet and condenser 70, or in the low-pressure side of condenser 70, by means of a short-time wide opening of the corresponding valve 90, 100, 110.

Condenser 70, in cooling off the compressed air, forms condensation water that is eliminated in water eliminator 80, positioned downstream. To achieve this purpose, pre-cooled, moist, compressed air from reheater 50 or main heat exchanger 40 is streamed through the high-pressure side, or hot-air side, of condenser 70. On the low-pressure (cold) side, the condenser is impacted by cold turbine outlet air or with a mixture of turbine outlet air and the hot air added by means of valves 90, 100, 110.

FIG. 3 shows, in various views, the structure of this kind of condenser as known from the state of the art (U.S. Pat. No. 4,352,273). As described above, ice can form on the low-pressure side of condenser 70 due to the turbine outlet temperature being below the freezing point. In order to avoid a blockage of condenser 70 even in cases of extreme ice build-up, the condenser is furnished with a bypass in the center on the low-pressure side. No cooling fins for heat transfer are found in this piece, which makes it harder for ice to build up. If a blockage occurs in spite of the bypass, then the ice is melted away using an increased quantity of hot air, for which purpose valves 90, 100, 110 are opened accordingly. The share of the bypass air amounts to about 30% of the entire quantity of air fed into the low-pressure side of condenser 70.

As can be seen in FIG. 3, in the case of condenser 70 as known from the state of the art, the hot air in the inlet area of the heat exchange unit is largely mixed together with the turbine outlet air and this mixture is then distributed across the bypass and the heat exchange unit.

A drawback associated with this is that the moisture content of the climate control system's outlet air increases when the TCV valves 90, 100, 110 are opened, that is, when the climate control system is operated at partial power. This is shown by FIG. 4, which demonstrates that the moisture content of the climate control system's outlet air rises the more the system is operated at partial power.

Especially during partial power operation, the risk of ice and snow build-up is greatest at an outlet-temperature of about −5° C., while under stronger cooling conditions, that is with the TCV valves closed, the risk is significantly lower; in this case the outlet temperature of the climate control system is about −15° C. This shows that, especially in the partial power range, a particularly low air humidity would be advantageous.

The moisture increase described above occurs at all connection positions shown in FIG. 2. The reasons for it are:

1. In the case of all TCV valve connections, the corresponding hot air is mixed in prior to the inlet on the low-pressure side of condenser 70 and in this way it increases the inlet temperature. The temperature increase of the cooling medium results in a correspondingly lesser cooling off on the high-pressure side, which in turn results in less condensation water being precipitated out for the water elimination, that is, the air fed into the turbine has a higher moisture content.
2. In the case of the connections with valves 90 and 100, the hot air forms a bypass with respect to condenser 70 and water eliminator 80. This has the result that this air is not dehumidified and thus the moisture content of the outlet air is increased accordingly.
3. In the case of the connection with valve 110, a bypass of turbine 60 occurs, while compressor 30 continues to have to handle the entire flow. In this way, the balance between these two wheels of the air-cycle machine shifts, [which] has a negative effect on the compressor efficiency. The compressor outlet temperature increases thereby, and ultimately the temperature level in the condenser also increases (less condensation water). The declining compressor efficiency results in the further drawback that the flow-through capacity of the climate control system is reduced. This means that, in spite of the reduction in the cooling performance in the partial power range, the need for compression of the supply air remains high or even increases, while in the case of the connections with valves 90 and 100 the need for compression steadily drops as valve 90, 100 is opened. This higher burden increases the operating costs and reduces the useful life of the compressed air supplier.

Moreover, this connection with valve 110 has the drawback that, due to the relatively low temperature of the hot air, at only about 40° C., reliable de-icing on the low-pressure side of condenser 70 is not possible. Therefore, an additional valve would be needed, with the associated drawbacks in terms of structural volume, weight, and cost.

SUMMARY OF THE INVENTION

Thus the present invention is based on the task of keeping the humidity of the outlet air of the climate control system to a low level even in the partial power range, while maintaining a high level of flow-through capacity of the climate control system.

Starting from the condenser mentioned at the start, this task is solved by the invention in that the hot-air inlet is positioned in such a way that the hot air essentially flows within a partial area of the inlet on the cool-air side of the condenser and that the bypass inlet is positioned in the partial area downstream from the hot-air inlet. This results in the advantage that the hot air is essentially mixed in, on the low-pressure side, only at or after the heat exchange unit. The condenser bypass, in which advantageously no heat exchange takes place, is thus used as an integrated conduit for the fed-in hot air. The actual mixture, on the low-pressure side, occurs downstream of the cool-air-side inlet, and preferably only at the outlet of the condenser. In terms of construction technique, the hot air is mixed in on the low-pressure side in the inlet area of the condenser bypass.

The invention encompasses embodiments in which the bypass circumvents the cool-air side of the heat exchange unit completely or only for a section. There results accordingly a mixture in or after the heat exchange unit.

The bypass can be positioned along the edge of the condenser. In this way it can be achieved that the hot-air stream, which is fed through the hot-air inlet and can likewise be positioned in the edge area, can be reliably be fed predominantly or entirely into the bypass of the condenser. The hot air is mixed in the inlet area of the laterally positioned condenser-bypass, in-this case likewise, for example, in the edge area of the low-pressure side of the condenser. Generally speaking, any desired different positioning of the bypass or hot-air inlet is possible, such as a positioning in the center of the condenser. The bypass can be positioned, for example, in the center of the condenser and the hot-air inlet can be designed as a connection piece feeding into the center of the inlet area of the condenser.

The bypass can be an integral component of the condenser.

It is advantageous if the hot-air inlet and the inlet of the bypass are oriented toward one another in such a way that the hot-air stream is fed entirely through the bypass. In this way the drawbacks known from the state of the art, resulting for example from the fact that an intensive mixture of the hot air with the cool air takes place on the inlet side of the heat exchange unit, are avoided in a particularly effective manner.

Alternatively, it can be provided that the hot-air inlet and the inlet of the bypass are oriented toward one another in such a way that the hot-air stream is fed predominantly through the bypass. In this case a small portion of the hot-air stream flows through the heat exchange unit.

It can be provided that the bypass is positioned in the edge area of the heat exchange unit and that an area, through which the air to be cooled can flow, is positioned between the outer wall of the heat exchange unit and the wall of the bypass. In this manner the bypass can be heated on both sides in order to prevent ice build-up, with the air to be cooled serving as the heating medium.

In a further embodiment of the invention it is provided that two or more bypasses are provided that are each positioned in the edge area of the condenser. The bypasses can also be positioned in the center of the condenser, or even some in the center and some in the edge area. Generally speaking, any desired design option is conceivable, for example the positioning of one, more than one, or all of the bypasses in the area between the condenser center and the edge area.

One or more than one valve can be provided, by means of which the volume flow of the hot air fed to the bypass or bypasses can be modified. The same is also applicable, of course, if only one bypass is provided. In the latter case, too, a valve can be provided by means of which the volume flow of the hot air fed through the hot-air conduit into the inlet area can be modified. If the corresponding valve is closed, then the system is being operated at maximum cooling power, since no hot air is mixed in. In this case the bypass fulfills its function as known already in the state of the art. The turbine outlet air flows partially through the heat exchange surface and partially through the bypass. Depending on the valve position, the hot air can then be mixed in, with the hot air flowing either exclusively or predominantly through the bypass, based on the positioning according to the invention, while the cool air flows predominantly through the heat exchange unit.

The valve or valves can be integrated into the heat exchange unit.

In a further embodiment of the present invention it is provided that a water eliminator is integrated into the outlet of the cool air or of the air to be cooled.

The heat exchange unit can be designed in any desired manner, for example as a crossflow, counterflow, or uniflow heat exchanger.

The present invention further relates to an air-based climate control system, especially for aircraft, having at least one turbine for decompression and cooling of the air to be fed into the passenger cabin and having a condenser with a heat exchange unit, the cool-air-side inlet of which is connected with the turbine outlet, and having an admixture conduit by means of which hot air can be mixed into the air to be fed into the passenger cabin. The admixture conduit feeds in, according to the invention, downstream of the inlet on the cool-air side of the heat exchange unit. This results, even in the partial power range, in a high heat-transfer performance in the condenser and thus in sufficient condensation water formation for the water elimination.

It is especially advantageous if the admixture conduit feeds into the outlet area of the heat exchange unit in the condenser. The hot air is mixed here with the cool air that has passed the heat exchange unit.

In a further embodiment of the present invention it is provided that the climate control system has a ram air canal in which one or more heat exchangers are positioned, through the cold-air side of which ram air or ambient air flows, and the hot-air side of which is connected to a hot-air conduit that is connected with the admixture conduit in such a way that the admixture conduit is supplied with hot air from the hot-air conduit. The pulling off from the hot-air conduit of the hot air to be fed into the admixture conduit can occur prior to the heat exchanger or heat exchangers, or else at any desired position between heat exchangers, or even on the hot-air side downstream from the heat exchanger or heat exchangers. The important thing is that the hot air have a higher temperature than the turbine outlet air. When the hot air is pulled off before it passes a heat exchange, this results in a particularly high temperature of the hot air. Likewise encompassed by the invention is the pulling off after or between the heat exchanger or heat exchangers, while, naturally, lower hot-air temperatures result.

It is especially advantageous if the condenser is designed as described herein, and the admixture conduit is formed by the bypass of the condenser.

BRIEF DESCRIPTION OF THE DRAWINGS

Additional details and advantages of the invention are described based on one of the design embodiments depicted in the drawings.

DESCRIPTION OF THE PREFERRED EMBODIMENTS

Figure 5:
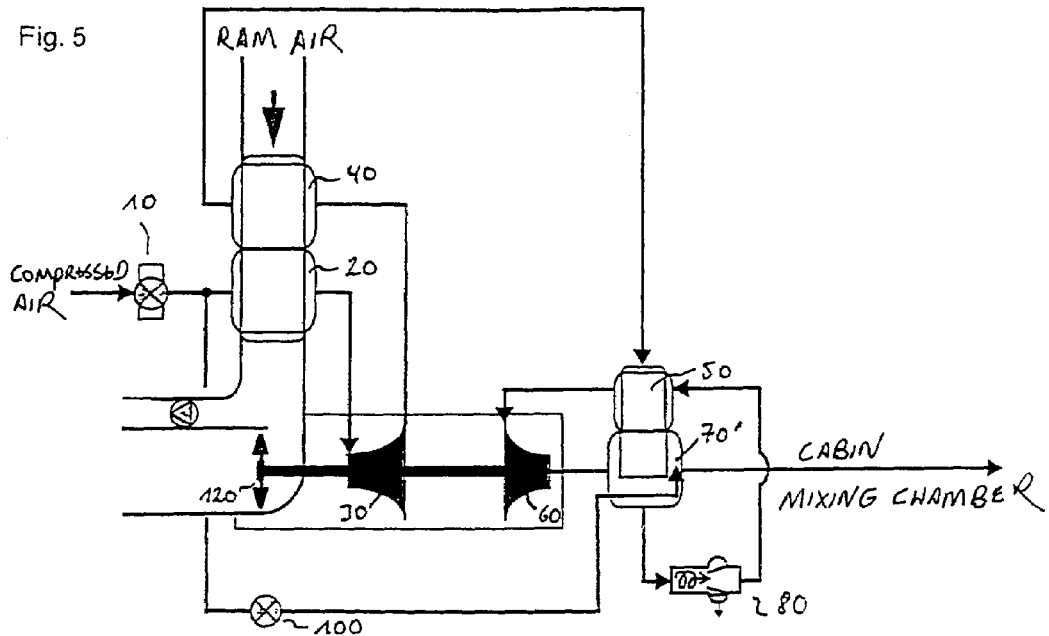
FIG. 5: shows a schematic diagram of an aircraft climate control system with a bypass connection according to the present invention.

FIG. 5 shows a schematic diagram of an aircraft climate control system according to the present invention. The same parts are labeled here with the same reference symbols as in the diagram of FIG. 2.

Figure 6:
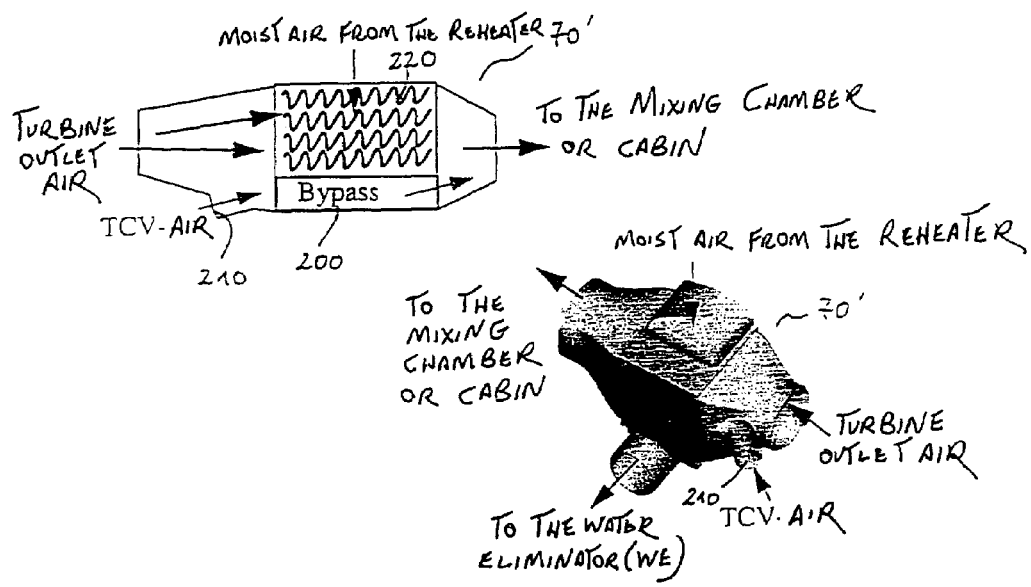
FIG. 6: shows various diagrams of the condenser according to the present invention.

The hot air is pulled off from the inlet side of the hot-air side of preliminary heat exchanger 20, and fed into condenser 70' via valve 100. Condenser 70' has the structure as seen in FIG. 6. Bypass 200 positioned in condenser 70' is positioned in such a way that the air flowing into condenser 70' via hot-air inlet 210 is fed exclusively or predominantly through bypass 200. Bypass 200 is positioned in the edge area of condenser 70' and thus is located to the side or below heat exchange unit 220. The bypass can also be positioned at a different place in the condenser, for example in the center or in an area between the center of the condenser and its edge area. The same is also true for the hot-air inlet. Generally speaking, more than one bypass and/or more than one hot-air inlet can be provided, which can likewise be positioned at any desired position in the condenser.

If valve 100 is open, then hot air (TCV air) flows through hot-air inlet 210 into condenser 70' and is then fed into bypass 200 due to the aligned positioning of hot-air inlet 210 and the inlet of bypass 200. The hot air flows through condenser 70' in bypass 200 of condenser 70', in accordance with FIG. 6, upper diagram. In a preferred embodiment of the invention, no heat exchange occurs in bypass 200. In terms of construction technique, the hot air is mixed in on the low-pressure side at the inlet area of laterally positioned bypass 200. Condenser bypass 200 is used as an integrated conduit for the hot air. The actual mixture with the cool air, that flows exclusively or predominantly through heat exchange unit 220 when valve 100 is open, occurs on the outlet side of heat exchange unit 220. Only in this area is the hot air mixed together with the cool air leaving heat exchange unit 220. Generally speaking, it is likewise possible to design the bypass conduit in such a way that it does not circumvent the entire heat exchange unit 220, but only a partial section of it, and feeds into the area of heat exchange unit 220.

As can be seen from FIG. 6, the outlet air of turbine 60 from FIG. 5 is used as cool air. The hot air is tapped from the inlet side of preliminary heat exchanger 20. The outlet of the cold-air side of condenser 70' is connected to the mixing chamber or the cabin of the aircraft. The medium to be cooled is comprised of moist air from reheater 50. After it passes condenser 70', this air is fed to water eliminator 80.

Figure 7:
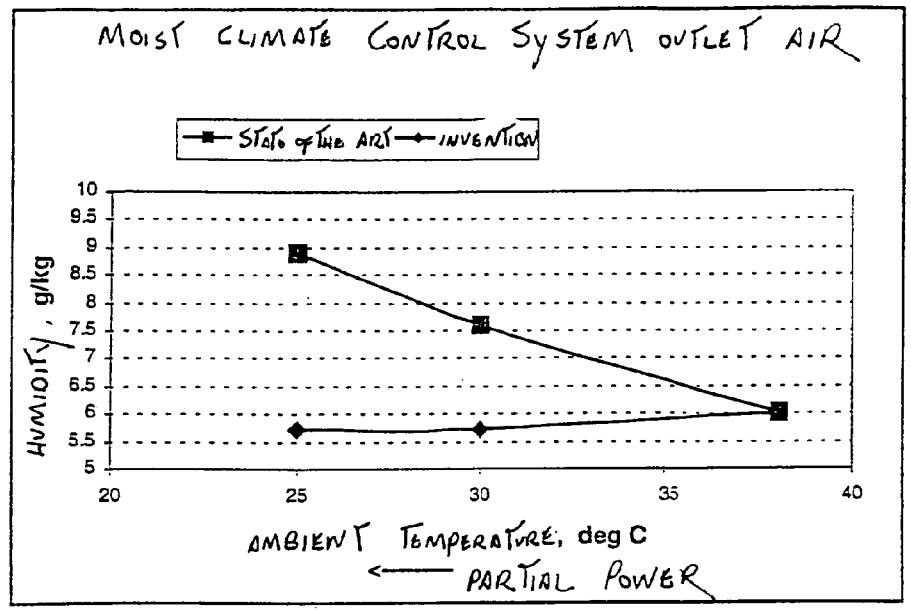
FIG. 7: shows the dependence of the humidity of the climate control system's outlet air on the load across the power range, according to the state of the art and the present invention.

The present invention offers the following advantages:
As can be seen in FIG. 7, even in the partial power range with valve 100 partially or completely open, the moisture of the outlet air of the climate control system remains at the low level of the maximum cooling situation. This results in corresponding advantages in terms of passenger comfort and the risk of icing up.

The main reasons for this are:

1. The hot TCV air fed through inlet 210 is mixed in on the thermodynamically low-pressure side preferably only after condenser 70'. This results, even in the partial power range, in a high heat transfer in condenser 70' and thus a high formation of condensation water for the water elimination.

Figure 8:
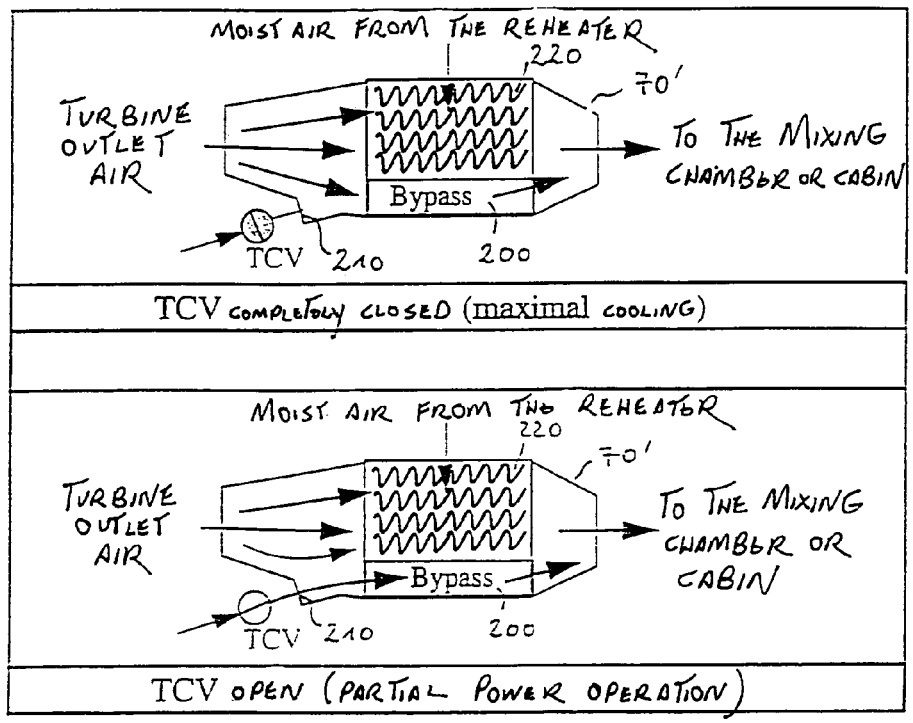
FIG. 8: shows the air distribution in the condenser according to the present invention.

2. In climate control systems according to the state of the art, the air distribution between the condenser bypass and cooling fins is essentially constant (about 30% bypass). The air distribution according to the present invention is variable, however, which results in corresponding advantages regarding condensation water formation and water elimination. As can be seen in FIG. 8, condenser 70' according to the invention can therefore be operated in different ways. As long as valve 100 is closed, there are no resulting differences compared to the state of the art, that is, for example, 30% of the turbine outlet air flows through bypass 200, while about 70% of the air flows through the cooling fins of heat exchange unit 220. In this state of operation, bypass 200 performs the same function as according to the state of the art.

If valve 100 is opened, the hot air entering condenser 70' through hot-air inlet 210 flows directly to the inlet of condenser bypass 200. The flow of the turbine outlet air is affected in this case in such a way that less turbine air flows into bypass 200 and more flows through the cooling fins of heat exchange unit 210. At least part of bypass 200 is thus filled by hot air. The higher share of turbine air that flows into the low-pressure side of condenser 70', compared to the state of the art, results in a more beneficial mass flow ratio of hot to cold condenser air and thus in a higher degree of condenser efficiency, with corresponding advantages for condensation water formation/water elimination.

A further advantage of the present invention consists in the compact and lightweight construction of condenser 70' and thus of the climate control system, since bypass 200 can be used as an integrated conduit. Thus in this embodiment, a conduit around condenser 70' is not required.

Positioning of the hot-air feed-in at the inlet area of condenser bypass 200 also enables de-icing thereof. Thus, in general, no second valve is required for any de-icing process, which is associated with corresponding advantages in terms of weight, structural volume, and cost.

Figure 1:
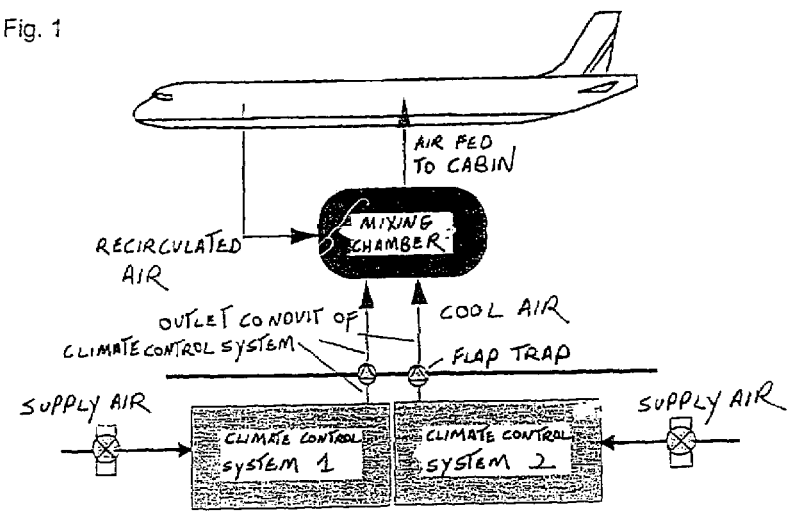
FIG. 1: shows a schematic diagram of an aircraft climate control system with a mixing chamber.
Figure 2:
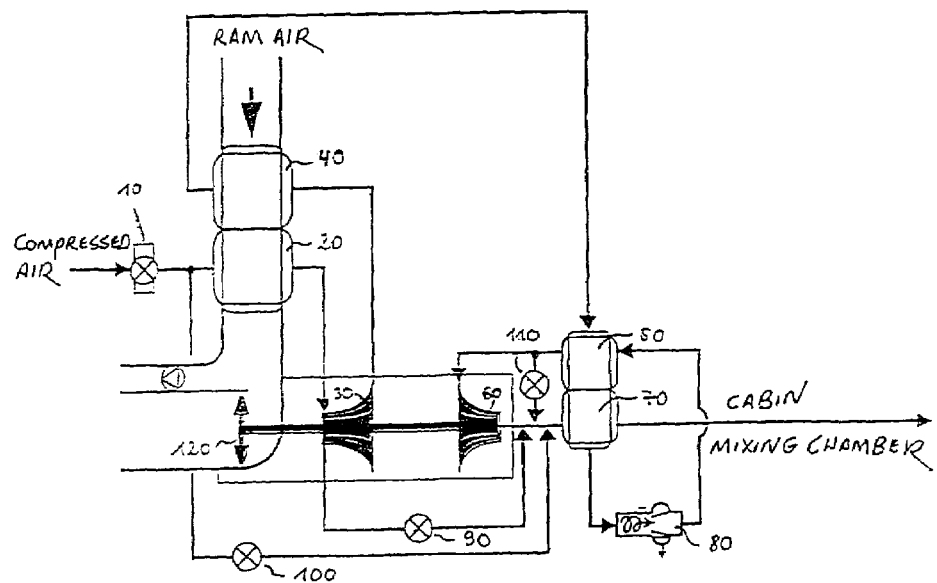
FIG. 2: shows a schematic diagram of an aircraft climate control system with different bypass positions according to the state of the art.
Figure 3:
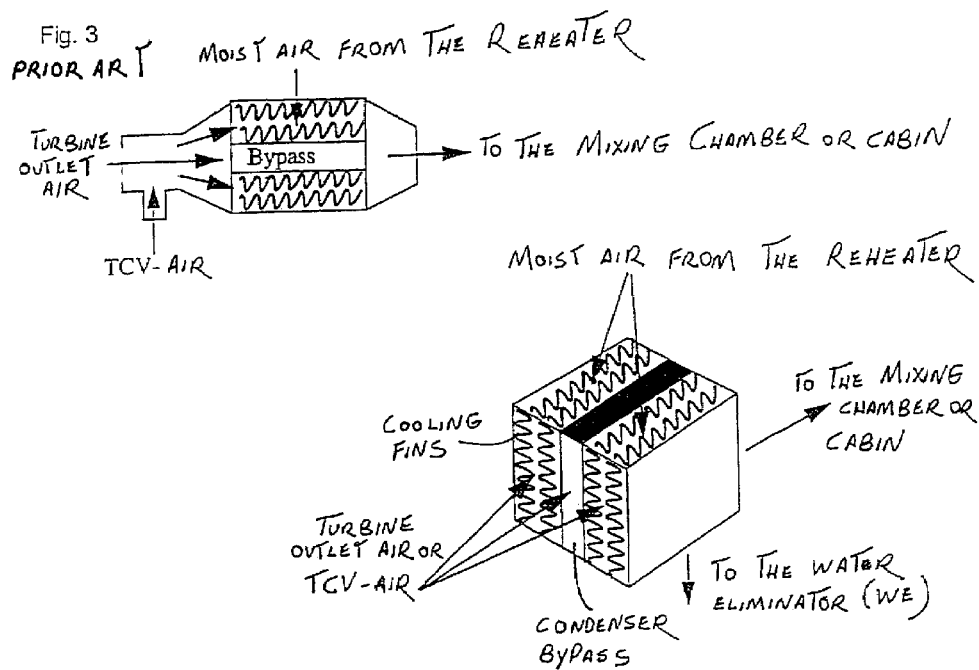
FIG. 3: shows the structure of a condenser according to the state of the art.
Figure 4:
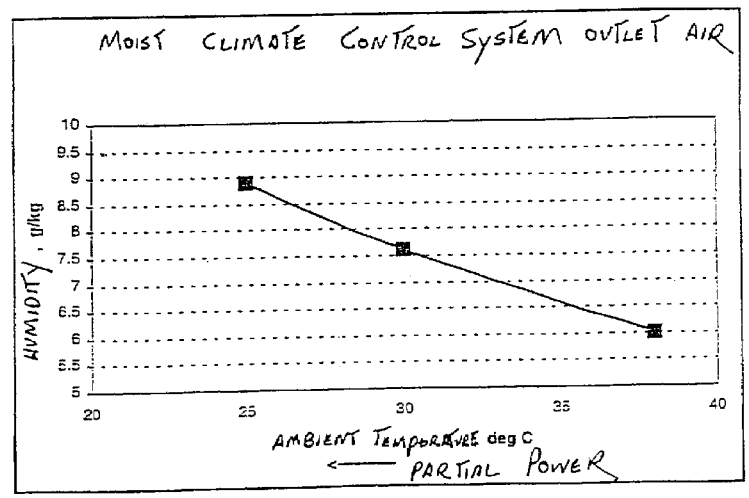
FIG. 4: shows the dependence of the humidity of the climate control system's outlet air on the load across the power range.

In contrast to the bypass positioning with valve 110 according to FIG. 2, the partial power operating behavior (degree of compressor efficiency) of the air-cycle machine (ACM) that is designed as a three-wheel machine according to FIGS. 2 and 5 is not adversely affected, because in this case a bypass of the compressor and turbine takes place. Thus both wheels are impacted by the same quantity of air even in partial power operation. Even in partial power operation, the compressor operates with a high degree of efficiency. The compressed air supplier is thus unburdened, which results in lower operating costs and a longer expected useful life.

Figure 9:
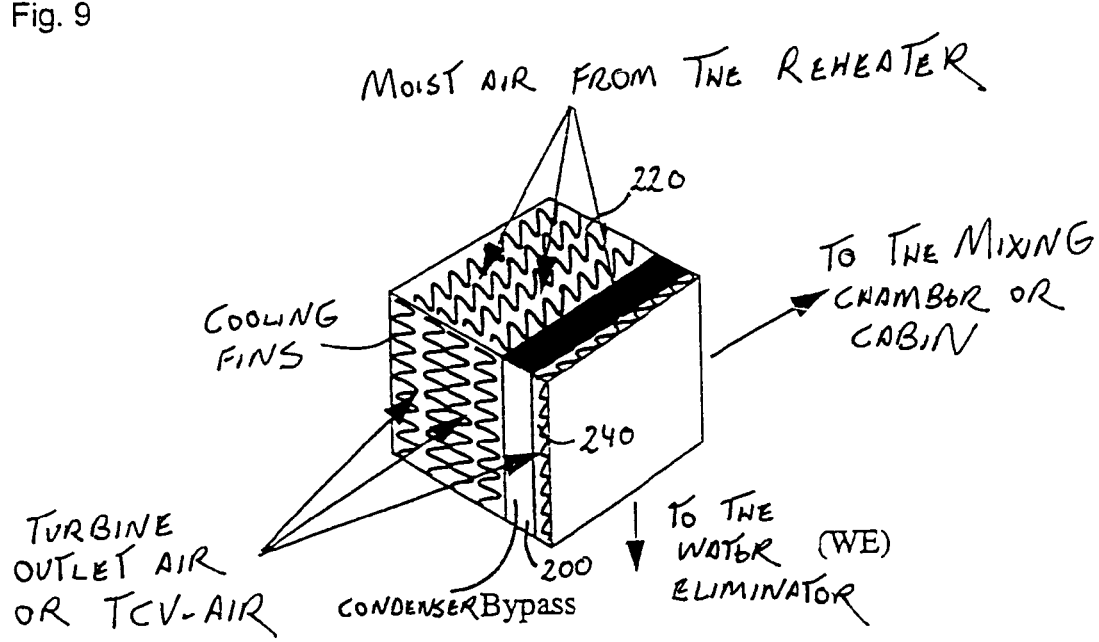
FIG. 9: shows a condenser according to the present invention, with a laterally positioned bypass and a heated external wall.

FIG. 9 shows another embodiment of the condenser according to the invention. In this case, there is an area 240 between bypass 200 and the outside of heat exchange unit 220, through which warmer air to be cooled flows. This results in the advantage that both sides of bypass 200 are heated in order to prevent ice build-up.

The present invention makes it possible to keep the moisture content of the climate control system's outlet air low even in the partial [power] range, which is achieved by the fact that the hot air fed in is not yet completely mixed in with the turbine outlet air already in the inlet area of the heat exchange unit. It is especially advantageous if the bypass of the condenser is used for the admixture of the hot air. In partial power operation, this hot air flows essentially through the bypass of the condenser and is preferably mixed together with the cool air in the outlet area of the heat exchange unit. In the case of maximum cooling power, the bypass is impacted by cool air.

The invention claimed is:

1. Condenser for an air-based climate control system, having an inlet and an outlet for the air to be cooled, an inlet and an outlet for the cool air, a heat exchange unit for heat transfer between the air to be cooled and the cool air, a bypass that circumvents the cool-air side of the heat exchange unit at least within a certain area, and a hot-air inlet on the cool-air side by means of which hot-air can be fed into the condenser, characterized in that the hot-air inlet is positioned in such a way that the hot air essentially flows in a partial area on the cool-air side of the condenser inlet and that the bypass inlet is positioned in the partial area downstream of the hot-air inlet.

2. Condenser according to claim 1, characterized in that the bypass is positioned in the edge area of the condenser or in the center or in an area between these positions.

3. Condenser according to claim 2, characterized in that the bypass is an integral component of the condenser.

4. Condenser according to claim 2, characterized in that the hot-air inlet and the bypass inlet are oriented toward one another in such a way that the hot-air stream is fed entirely through the bypass.

5. Condenser according to claim 2, characterized in that the hot-air inlet and the bypass inlet are oriented toward one another in such a way that the hot-air stream is fed predominantly through the bypass.

6. Condenser according to claim 2, characterized in that the hot-air inlet and the bypass inlet are oriented toward one another in such a way that the hot-air stream is fed predominantly through the bypass.

7. Condenser according to claim 1, characterized in that the bypass is an integral component of the condenser.

8. Condenser according to claim 7, characterized in that the hot-air inlet and the bypass inlet are oriented toward one another in such a way that the hot-air stream is fed entirely through the bypass.

9. Condenser according to claim 1, characterized in that the hot-air inlet and the bypass inlet are oriented toward one another in such a way that the hot-air stream is fed entirely through the bypass.

10. Condenser according to claim 1, characterized in that the hot-air inlet and the bypass inlet are oriented toward one another in such a way that the hot-air stream is fed predominantly through the bypass.

11. Condenser according to claim 1, characterized in that the bypass is positioned in the edge area of the heat exchange unit and that an area, through which the air to be cooled can flow, is positioned between the outer wall of the heat exchange unit and the wall of the bypass.

12. Condenser according to claim 1, characterized in that two or more bypasses are provided that are each positioned in the edge area of the condenser.

13. Condenser according to claim 1, characterized in that one more than one valve is provided, by means of which the volume flow of the hot air fed to the bypass or bypasses can be modified.

14. Condenser according to claim 13, characterized in that the valve or valves are integrated into the heat exchange unit.

15. Condenser according to claim 1, characterized in that a water eliminator is provided that is integrated into the outlet of the cool air or of the air to be cooled.

16. Condenser according to claim 1, characterized in that the heat exchange unit is designed in any desired manner, in particular, as a cross flow, counterflow, or uniflow heat exchanger.

17. Climate control system comprising a condenser designed according to claim 1 and an admixture conduit is formed by a bypass of the condenser.

* * * * *